United States Patent
McKenney

(10) Patent No.: US 9,250,979 B2
(45) Date of Patent: *Feb. 2, 2016

(54) ASYNCHRONOUS GRACE-PERIOD PRIMITIVES FOR USER-SPACE APPLICATIONS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 629 days.

This patent is subject to a terminal disclaimer.

(21) Appl. No.: 13/454,443

(22) Filed: Apr. 24, 2012

(65) Prior Publication Data

US 2012/0331238 A1 Dec. 27, 2012

Related U.S. Application Data

(63) Continuation of application No. 13/169,570, filed on Jun. 27, 2011.

(51) Int. Cl.
*G06F 9/52* (2006.01)
*G06F 13/00* (2006.01)

(52) U.S. Cl.
CPC ..................................... *G06F 9/526* (2013.01)

(58) Field of Classification Search
CPC ........................... G06F 9/526; G06F 17/30371
See application file for complete search history.

(56) References Cited

U.S. PATENT DOCUMENTS

| | | | |
|---|---|---|---|
| 5,247,676 A | 9/1993 | Ozur et al. | |
| 5,442,758 A | 8/1995 | Slingwine et al. | |
| 5,608,893 A | 3/1997 | Slingwine et al. | |
| 5,727,209 A | 3/1998 | Slingwine et al. | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,191,272 B2 | 3/2007 | McKenney | |
| 7,287,135 B2 | 10/2007 | McKenney et al. | |
| 7,349,926 B2 | 3/2008 | McKenney et al. | |

(Continued)

OTHER PUBLICATIONS

Guniguntala et al., The read-copy-update mechanism for supporting real-time applications on shared-memory multiprocessor systems with Linux, Jan. 17, 2008, Allen Press, Inc., IBM Systems Journal, vol. 4, No. 2, pp. 1-16.*

(Continued)

*Primary Examiner* — Van Nguyen
*Assistant Examiner* — Melissa Alfred
(74) *Attorney, Agent, or Firm* — Walter W. Duft

(57) ABSTRACT

A technique for implementing user-level read-copy update (RCU) with support for asynchronous grace periods. In an example embodiment, a user-level RCU subsystem is established that executes within threads of a user-level multithreaded application. The multithreaded application may comprise one or more reader threads that read RCU-protected data elements in a shared memory. The multithreaded application may further comprise one or more updater threads that perform updates to the RCU-protected data elements in the shared memory and register callbacks to be executed following a grace period in order to free stale data resulting from the updates. The RCU subsystem may implement two or more helper threads (helpers) that are created or selected as needed to track grace periods and execute the callbacks on behalf of the updaters instead of the updaters performing such work themselves.

7 Claims, 16 Drawing Sheets

(56) References Cited

U.S. PATENT DOCUMENTS

| | | | |
|---|---|---|---|
| 7,353,346 | B2 | 4/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 2005/0071811 | A1* | 3/2005 | Appavoo et al. ............ 717/122 |
| 2005/0240930 | A1* | 10/2005 | Amamiya et al. ........... 718/100 |
| 2006/0112121 | A1 | 5/2006 | McKenney et al. |
| 2006/0117072 | A1 | 6/2006 | McKenney |
| 2006/0130061 | A1 | 6/2006 | McKenney |
| 2006/0265373 | A1 | 11/2006 | McKenney et al. |
| 2007/0101335 | A1* | 5/2007 | Nagampalli et al. ......... 718/102 |
| 2007/0198520 | A1 | 8/2007 | McKenney et al. |
| 2008/0082532 | A1 | 4/2008 | McKenney |
| 2008/0140951 | A1 | 6/2008 | McKenney et al. |
| 2008/0313238 | A1* | 12/2008 | McKenney et al. .......... 707/200 |
| 2009/0006403 | A1 | 1/2009 | McKenney |
| 2009/0077080 | A1 | 3/2009 | McKenney |
| 2009/0254764 | A1 | 10/2009 | McKenney et al. |
| 2010/0023946 | A1 | 1/2010 | McKenney |
| 2011/0055183 | A1 | 3/2011 | McKenney |
| 2011/0082892 | A1* | 4/2011 | Ogasawara ................. 707/819 |

OTHER PUBLICATIONS

J. Seigh, "RCU +SMR for preemptive kernel/user threads," Linux Kernel Mailing List, May 9, 2005, 2 pages.

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al, "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, Jan. 2004, 18 pages.

P. McKenney et al., "Scaling dcache with RCU," Linux Journal, Jan. 1, 2004, 12 pages.

P. McKenney et al., "Using RCU in the Linux 2.5 Kernel," LInux Journal, Oct. 1, 2003, 11 pages.

P. McKenney et al.,"Read-Copy Update," 2002 Ottawa Linux Symposium, Jul. 8, 2002, 28 pages.

H. Lindar et al., "Scalability of the Directory Entry Cache," 2002 Ottawa Linux Symposium, Jun. 26, 2002, pp. 289-300.

P. McKenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," Feb. 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

P. McKenney, "Sleepable RCU", LWN.net, Oct. 9, 2006, 10 pages.

P. McKenney, "Read-Copy Update Implementations", Jan. 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al., "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN. net, Oct. 8, 2007, 27 pages.

P. McKenney, "Integrating and Validating dynticks and Preemptible RCU," LWN.net, Apr. 22, 2008, 19 pages.

P. McKenney, "Hierarchical RCU," LWN.net, Nov. 4, 2008, 19 pages.

P. McKenney, "Is Parallel Programming Hard, and, if so, What Can You Do About It", Mar. 8, 2009, 146 pages.

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

P. McKenney et al., "Exploiting Deferred Destruction: An Analysis of Read-Copy-Update Techniques in Operating System Kernels", Jan. 3, 2005, pp. 1-41.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology into Linux", 2008 Linux Developer Symposium, China, 2008, 47 pages.

P. McKenney, "Simplicity Through Optimization", linux.conf.au, Jan. 2010, 109 pages.

P. McKenney, "Deterministic Synchronization in Multicore Systems: the Role of RCU", Aug. 18, 2009, pp. 1-9.

P. McKenney, "RCU cleanups and simplified preemptable RCU", LKML.org, Jul. 23, 2009, 1 page.

P. McKenney, "Expedited "big hammer" RCU grace periods", LKML.org, Jun. 25, 2009, 2 pages.

P. McKenney, "RCU: The Bloatwatch Edition", LWN.net, Mar. 17, 2009, 9 pages.

M. Desnoyers, "Low-Impact Operating System Tracing", University of Montreal, PhD Thesis, Dec. 2009, 233 pages.

P. McKenney, "Using a Malicious User-Level RCU to Torture RCU-Based Algorithms", linux.conf.au, Jan. 2009, 51 pages.

Jul. McKenney et al., "Introducing Technology Into the Linux Kernel: A Case Study", Operating Systems Review, 2008, 16 pages.

(56) References Cited

OTHER PUBLICATIONS

P. McKenney, "What is RCU, Fundamentally", LWN.net, Dec. 17, 2007, 15 pages.

P. McKenney, What is RCU? Part 2: Usage, LWN.net, Dec. 24, 2007, 15 pages.

P. McKenney, RCU part 3: the RCU API, LWN.net, Jan. 7, 2008, 7 pages.

T. Hart et al., "Performance of memory reclamation for lockless synchronization", Journal of Parallel and Distributed Computing, Dec. 2007, pp. 1270-1285.

McKenney, "Using Promela and Spin to verify parallel algorithms", LWN.net, Aug. 1, 2007, 11 pages.

McKenney, "RCU and Unloadable Modules", LWN.net, Jan. 14, 2007, 4 pages.

P. Zijlstra, "[PATCH] slab: document SLAB_DESTROY_BY_RCU", LKML.org, Nov. 13, 2008, 1 page.

A. Arcangeli et al., "Using Read-Copy-Update Techniques for System V IPC in the Linux 2.5 Kernel," 2003 FREENIX, Jun. 14, 2003, 13 pages.

M. Desnoyers et al., "User-Level Implementations of Read-Copy Update", IEEE Transactions on Parallel and Distributed Systems, vol. x, No. y, Jul. 2009, pp. 1-14.

M. Michael et al., "Nonblocking Algorithms and Preemption-Safe Locking on Multiprogrammed Shared Memory Multiprocessors", J. Parallel Distrib. Comput., vol. 51, No. 1, Jan. 10, 1998, pp. 1-26.

A. Mahesri et al., "Hardware Support for Software Controlled Multithreading", ACM Digital Library, vol. 35, No. 1, Mar. 2007, pp. 3-12.

M. Desnoyers, "urcu-defer.c", git://git.lttng.org/userspace-rcu.git, Jan. 2009, 6 pages.

M. Desnoyers et al., "urcu-defer.h", git://git.lttng.org/userspace-rcu.git, Jan. 2009, 1 page.

\* cited by examiner

ASYNCHRONOUS GRACE-PERIOD PRIMITIVES FOR USER-SPACE APPLICATIONS

This application is a continuation under 35 U.S.C. 120 of application Ser. No. 13/169,570, filed Jun. 27, 2011, entitled "Asynchronous Grace-Period Primitives For User-Space Applications."

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" in a user-level computing environment.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may be synchronous or asynchronous. According to the synchronous technique, an updater performs the first phase update operation, blocks (waits) until a grace period has completed, and then implements the second phase update operation, such as by removing stale data. According to the asynchronous technique, an updater performs the first phase update operation, specifies the second phase update operation as a callback, then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows asynchronous grace period overhead to be amortized over plural deferred update operations.

In operating system kernel implementations of RCU, callback registration and processing is performed by code sections whose execution is well-defined and highly deterministic. An example of such code is the call_rcu( ) primitive that registers a callback for deferred processing following an asynchronous grace period, and then invokes a callback processing primitive such as process_callbacks( ) to execute one or more pending callbacks at the end of a grace period. The situation is less favorable when RCU is run in user space. Current user-level versions of the call_rcu( ) primitive have limitations due to the fact that user-level applications generally do not have the degree of control over execution that is typically found in kernels.

For example, the user-space rcu library for the LTTng (Linux Trace Toolkit) Project includes a defer_rcu( ) primitive that updaters use to queue RCU callbacks (see the urcu_defer.c and urcu_defer.h files at git:///lttng.org/usrspace-rcu.git). The urcu_defer.c file contains a primitive named "rcu_defer_register_thread( ) that calls a primitive named "start_defer_thread( )" to create a thread for executing callbacks. However, within the defer_rcu( ) primitive itself, a call is made to synchronize_rcu( ) to force a synchronous grace period if there are too many pending callbacks. The advantage of forcing a synchronous grace period is that it avoids out-of-memory conditions that could otherwise result in cases where there were never any naturally occurring synchronize_rcu( ) invocations. Unfortunately, the above-described implementation of defer_rcu( ) will block updaters in some cases, and is therefore not fully deterministic. This may not be desirable for the critical path of a real-time application. In FIG. 11 of M. Desnoyers et al., "User-Level Implementations of Read-Copy Update", IEEE Transactions On Parallel And Distributed Systems, Vol. X, No. Y, July 2009, pp. 1-14, a user-space call_rcu( ) primitive is proposed that would invoke a primitive named "call_rcu_cleanup( )" to process callbacks in a separate thread following a grace period so that updaters invoking call_rcu( ) will be wait-free. However, this proposal envisions only a single global callback processing thread, which could become overwhelmed in large multiprocessor systems and would suffer gratuitous cache-miss overhead when invoking callbacks registered on other processors. Implementing this approach would be problematic if real-time response is desired.

SUMMARY

A method, system and computer program product are provided for implementing user-level read-copy update (RCU) with support for asynchronous grace periods. In an example embodiment, a user-level RCU subsystem is established that executes within threads of a user-level multithreaded application. The multithreaded application may comprise one or more reader threads that read RCU-protected data elements in a shared memory. The multithreaded application may further comprise one or more updater threads that perform updates to the RCU-protected data elements in the shared memory and register callbacks to be executed following a grace period in order to free stale data resulting from the updates. The RCU subsystem implements two or more helper threads (helpers) that can be created or selected as needed to track grace periods and execute callbacks on behalf of the updaters instead of the updaters performing such work themselves.

In another embodiment, the two or more helper threads may include a default helper and one or more of a per-thread helper, a per-CPU helper or a per-node helper. In another embodiment, a single one of the two or more helper threads may be assigned to operate as the default thread and as one or more of the per-thread helper, the per-CPU helper or the per-node helper. In another embodiment, the two or more helper threads may each have an associated helper thread data structure whose fields may include a callback list header field, a flags field, a lock field, a condition field, a callback list length field, a helper thread identifier field and a list head field. In another embodiment, the RCU subsystem may comprise a register callback component that enqueues a callback on a callback list of one of the helper thread data structures and wakes up the data structure's associated helper thread. In another embodiment, the RCU subsystem comprises a grace period detection/callback processing component that is implemented by the two or more helper threads on behalf of the updaters. In another embodiment, the grace period detection/callback processing component processes callbacks while they are pending, then either (1) polls for a specified time period to await new callbacks if a real-time updater is being serviced, or (2) sleeps to await awakening if a non-real-time updater is being serviced. In another embodiment, the RCU subsystem comprises a set of helper thread functions for creating, ending, waking, querying and assigning the two or more helper threads.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

Figure 1A:
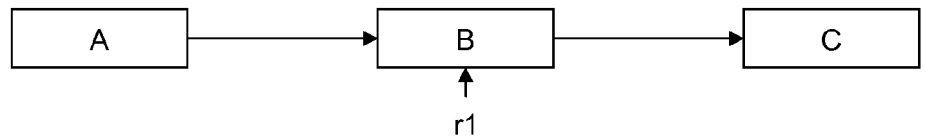
FIGS. 1A-1D are diagrammatic representations of a linked list of data elements undergoing a data element replacement according to a conventional read-copy update mechanism.
Figure 1B:
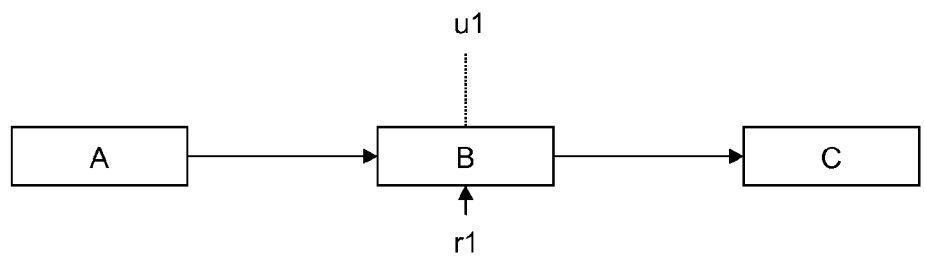
Figure 1C:
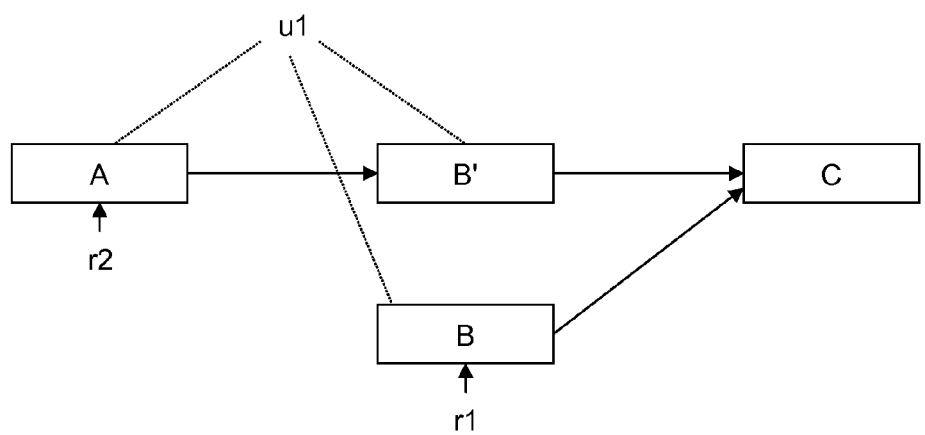
Figure 1D:
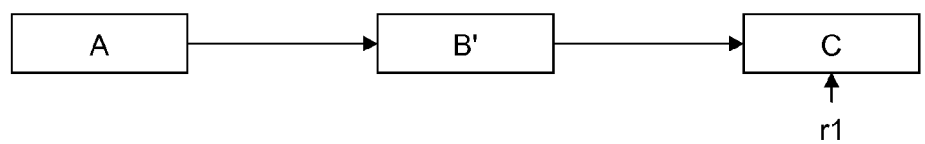
Figure 2A:
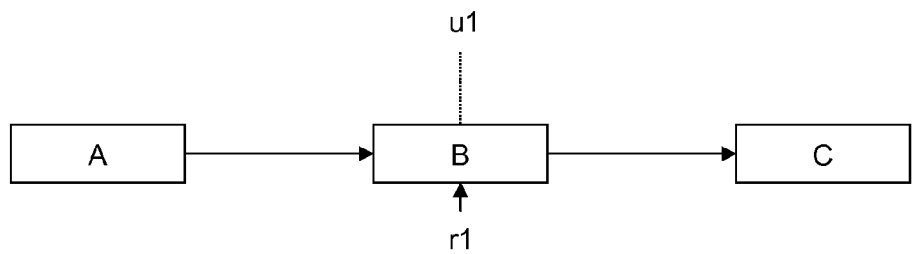
FIGS. 2A-2C are diagrammatic representations of a linked list of data elements undergoing a data element deletion according to a conventional read-copy update mechanism.
Figure 2B:
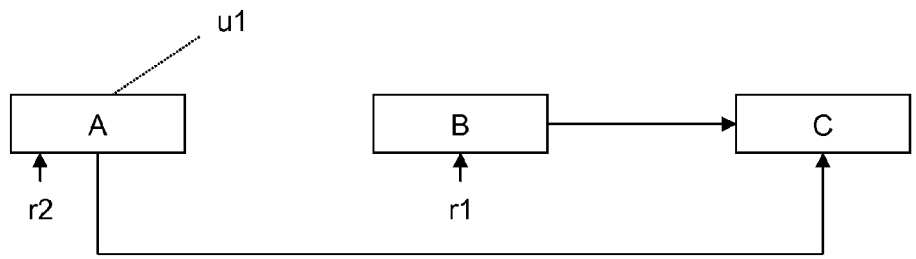
Figure 2C:
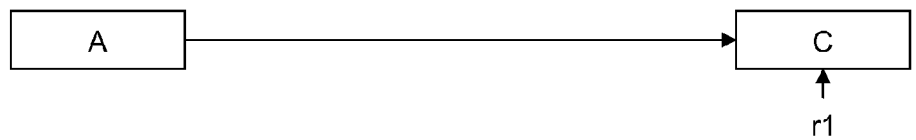
Figure 3:
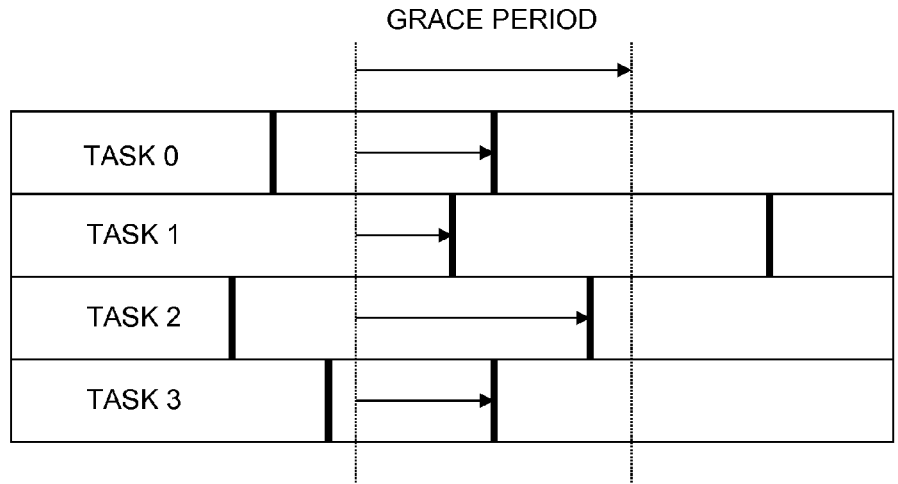
FIG. 3 is a flow diagram illustrating a grace period in which four processes pass through a quiescent state.

The present disclosure describes an efficient technique for supporting asynchronous grace periods in user-level RCU implementations. According to example embodiments described in more detail below, the technique optionally provisions two or more helper threads to handle the RCU callbacks of one or more worker threads. In this context, a worker thread can be any thread that registers a callback for processing following an asynchronous grace period, such as by invoking a register callback component (see below). In most cases, worker threads will be updaters. However, the register callback component could also be invoked by readers while performing an update within an RCU read-side critical section, or could even be invoked during the processing of an RCU callback. In the former case, readers that invoke the register callback component would also be worker threads. In the latter case, helper threads that invoke the register callback component during callback processing would also be worker threads. However, such helper threads would most likely process new callbacks that they registered on their own behalf, but could conceivably invoke additional helper threads if desired.

The helper threads may have varying scope according to the number of worker threads they support. At one extreme, a single default system-wide helper thread may be provided to support all worker threads. At the other extreme, per-thread helper threads may be exclusively assigned to individual worker threads. Between these extremes, it would be possible to create many other worker thread/helper thread relationships, including but not limited to per-processor helper threads that are assigned to worker threads on a given processor, per-node worker threads that are assigned to worker threads on a given node (e.g., for NUMA systems), etc. Helper threads may also be assigned to worker threads other means, including random or round-robin.

In an embodiment, each helper thread has a corresponding data structure whose elements may include a (1) helper thread callback list, (2) a helper thread identifier, (3) a helper thread lock, (4) a helper thread condition indicator, (5) a set of helper thread flags, (6) a helper thread callback counter, and (7) a list_head for maintaining the helper thread data structure on a list of helper thread data structures. Details of the helper thread data structures are described in more detail below.

In an embodiment, helper threads may be created in advance of any worker threads invoking the register callback component. Alternatively, the register callback component may be implemented so that it will create a new helper thread the first time it is invoked by a worker thread if there are no existing helper threads available. Prior to creating a new helper thread, the register callback component may look for existing helper threads that can be used on the worker thread's behalf. By way of example, the register callback component may look first for a per-thread helper thread that has already been assigned to the worker thread, then a per-CPU helper thread, and finally the system default helper thread. Once a suitable helper thread has been identified (or created if necessary), the register callback component can wake up the thread and cause it to perform the appropriate callback operations. These operations include registering a new callback, waiting for the end of a grace period, and processing the callbacks on its callback list. In an embodiment, a new helper thread may be assigned to a worker thread if the worker thread is migrated away from the part of the system serviced by its current helper thread. This feature (as well as others) may be implemented by way of a set of one or more helper thread support functions (such as those that are described in more detail below).

Example Embodiments

Figure 4:
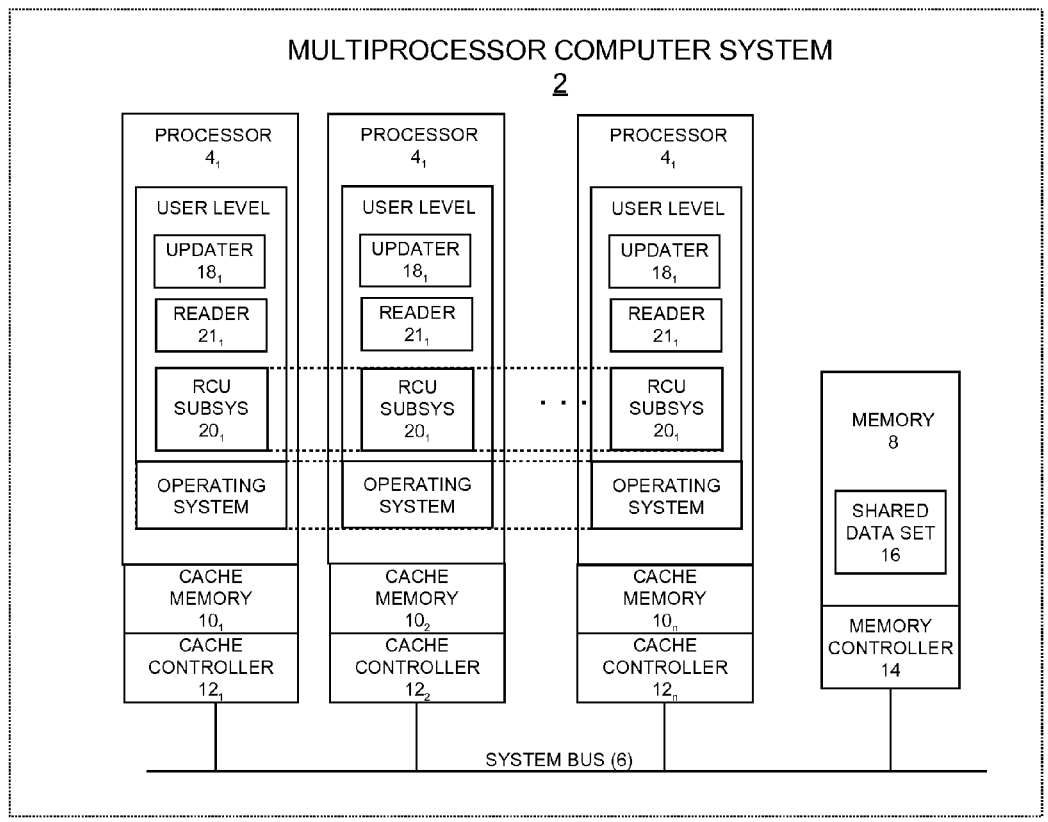
FIG. 4 is a functional block diagram showing a multiprocessor computing system that may be implemented in accordance with the present disclosure.
Figure 5:
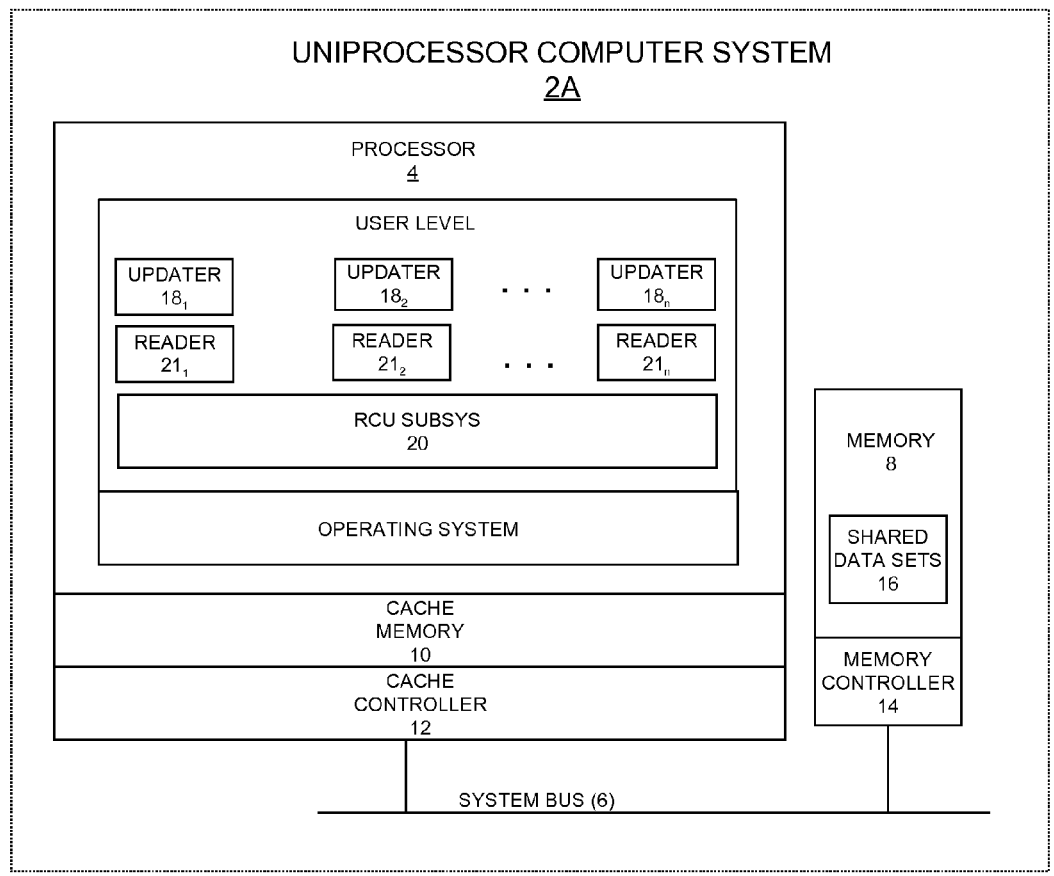
FIG. 5 is a functional block diagram showing a uniprocessor computing system that may be implemented in accordance with the present disclosure.

Turning now to the figures, wherein like reference numerals represent like elements in all of the several views, FIG. 4 illustrates a symmetrical multiprocessor (SMP) computing system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art). The computing system 2 is assumed to be under the management of a multitasking operating system adapted for use in an SMP environment. FIG. 5 shows a uniprocessor system 2A that is similar to multiprocessor system 2, except there is only a single processor 4 and a corresponding cache memory 10 and cache controller 12.

In each of FIGS. 4 and 5, the example computing systems 2 and 2A may represent any type of computing apparatus, including but not limited to, general purpose computers, special purpose computers, portable computing devices, communication and/or media player devices, set-top devices, embedded systems, to name but a few. In FIG. 4, the processors $4_1, 4_2 \ldots 4_n$ may each be implemented as an integrated single-core or multi-core CPU (Central Processing Unit) devices. Alternatively, the processors $4_1, 4_2 \ldots 4_n$ could represent individual cores within a single multi-core CPU device. In FIG. 5, the processor 4 may be a single-core or multi-core CPU device. Each processor 4 of FIGS. 4 and 5 is operable to execute program instruction logic under the control of a software program stored in the memory 8 (or elsewhere). The memory 8 may comprise any type of tangible storage medium capable of storing data in computer readable form, including but not limited to, any of various types of random access memory (RAM), various flavors of programmable read-only memory (PROM) (such as flash memory), and other types of primary storage. In FIG. 5, the processor 4 and the memory 8 may be situated within a single computing device or node. In FIG. 4, the processors $4_1, 4_2 \ldots 4_n$ may be situated within a single computing device or node (e.g., as part of a single-node SMP system) or they may be distributed over plural nodes (e.g., as part of a NUMA system, a cluster, a cloud, etc.).

It is further assumed in FIG. 4 that update operations executed within a user-level threads (or other user-level execution contexts) will periodically perform updates on a set of shared data 16 stored in the shared memory 8. Reference numerals $18_1, 18_2 \ldots 18_n$ illustrate individual user-level data update operations (updaters) that may periodically execute on the several processors $4_1, 4_2 \ldots 4_n$. Alternatively, the updaters $18_1, 18_2 \ldots 18_n$ could all run on a single processor 4 that is either part of the multiprocessor computing system 2, or is the sole processor of theft uniprocessor computing system 2A of FIG. 5. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ of FIG. 4, and the single processor 4 of FIG. 5, are programmed to implement a user-level read-copy update (RCU) subsystem 20 as part of their user-level application functions. In FIG. 4, the RCU subsystem 20 comprises RCU instances $20_1, 20_2 \ldots 20_n$ that periodically execute on the several processors $4_1, 4_2 \ldots 4_n$. In FIG. 5, there is but one instance of the RCU subsystem 2. Each of the processors $4_1, 4_2 \ldots 4_n$ of FIG. 4, and the single processor of FIG. 4, also periodically execute user-level read operations (readers) $21_1, 21_2 \ldots 21_n$ on the shared data 16. Such read operations will typically be performed far more often than updates, insofar as this is one of the premises underlying the use of read-copy update.

The updaters $18_1, 18_2 \ldots 18_n$, the readers $21_1, 21_2 \ldots 21_n$, and the RCU subsystem 2, including each of the RCU subsystem instances $20_1, 20_2 \ldots 20_n$, can be implemented as user-level threads within a multithreaded user-level program. As persons skilled in the art will appreciate, multithreaded programming is a form of parallel programming wherein several threads of control (also known as lightweight processes) may execute separately within a single application program. All threads share the same memory space, and can therefore work concurrently with shared data. The POSIX threads (pthreads) library is one example of a multithreaded implementation wherein each user-level thread is implemented with scheduling support being provided by the underlying operating system (e.g., Linux®). In an alternate embodiment, the user-level threads could be provided entirely at the user level via implementations such as "Green threads." In the example embodiments described hereinafter, a POSIX pthreads implementation is assumed for purposes of illustration only, and not by way of limitation.

The RCU subsystem 20 supports asynchronous grace periods. This type of grace period processing entails the management of callback lists that accumulate callbacks registered by the updaters $18_1, 18_2 \ldots 18_n$ until they are ripe for batch processing at the end of a given grace period. Updaters may register callbacks using a user-level variant of the call_rcu( ) primitive found in existing RCU implementations. As discussed in the "Introduction" section above, the registered callbacks occasionally need to be processed in order to free the memory associated with stale data elements. In accordance with the present disclosure, callback processing efficiency is improved by offloading callback processing from the updaters $18_1, 18_2 \ldots 18_n$ (worker threads) to two or more helper threads that can be created or selected as needed. This offloading is illustrated in FIGS. 6A-6D, which collectively depict two or more helper threads 22 that may be used by the updaters $18_1, 18_2 \ldots 18_n$ in the system 2 of FIG. 4 to perform callback processing.

Figure 6A:
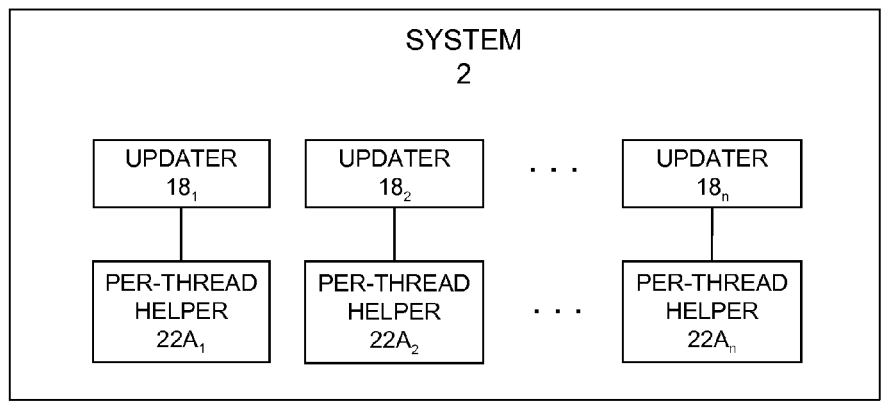
FIG. 6A is a functional block diagram showing an example set of updaters and per-thread helpers that may operate in the computer systems of FIGS. 4 and 5.
Figure 6B:
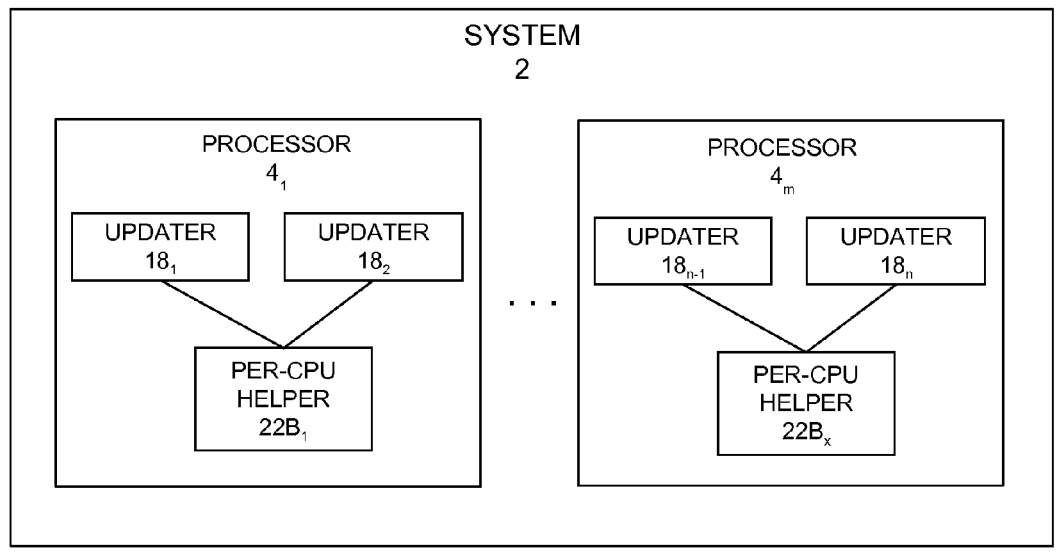
FIG. 6B is a functional block diagram showing an example set of updaters and per-CPU helpers that may operate in the computer systems of FIGS. 4 and 5.
Figure 6C:
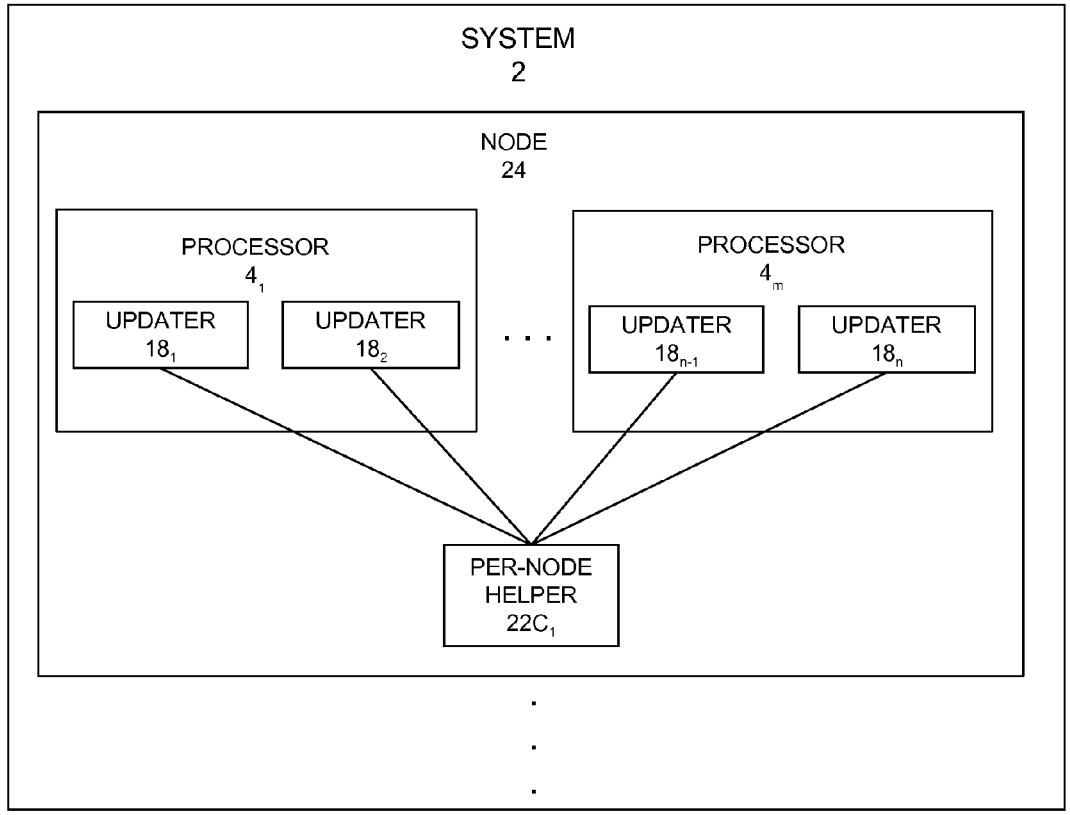
FIG. 6C is a functional block diagram showing an example set of updaters and per-node helpers that may operate in the computer systems of FIGS. 4 and 5.
Figure 6D:
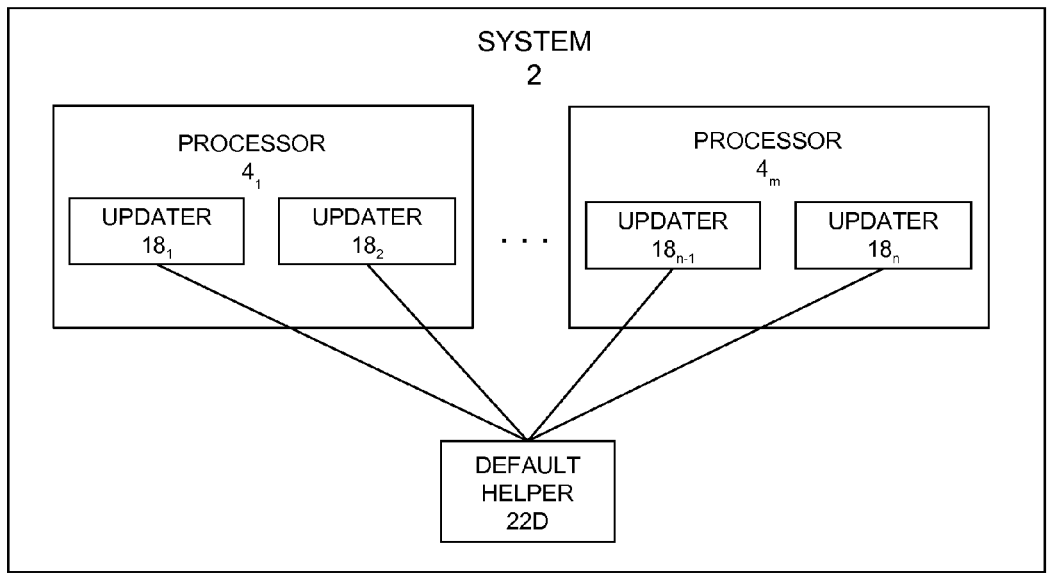
FIG. 6D is a functional block diagram showing an example set of updaters and a default helper that may operate in the computer systems of FIGS. 4 and 5.

In FIG. 6A, each updater $18_1, 18_2 \ldots 18_n$ has a corresponding per-thread helper thread $22A_1, 22A_2 \ldots 22A_n$. In FIG. 6B, updaters $18_1$ and $18_2$ on processor $4_1$ share a per-cpu helper thread $22B_1$, and updaters $18_{n-1}$ and $18n$ on processor $4_m$ share a per-cpu helper thread $22B_x$. In FIG. 6C, updaters $18_1$ and $18_2$ on processor $4_1$ and updaters $18_{n-1}$ and $18n$ on processor $4_m$ in a node 24 of the system 2 share a per-node cpu helper thread $22C_1$. Although not shown, other nodes in the system 2 could likewise have per-node helper threads $22C_2 \ldots 22C_y$. In FIG. 6D, updaters $18_1$ and $18_2$ on processor $4_1$ and updaters $18_{n-1}$ and $18n$ on processor $4_m$ in the system 2 share a system-wide default helper thread 22D.

It should be pointed out that the above-listed types of helper threads 22A, 22B, 22C and 22D are not necessarily provided by separate mutually exclusive helper threads 22. In fact, any given helper thread 22 may be assigned to serve as a per-thread helper 22A, a per-CPU helper 22B, a per-node helper 22C, and as the default helper 22D. In some cases, a given helper thread 22 might have overlapping assignments, for example, as a both per-thread helper 22A and as a per-CPU helper 22B, and so on. Indeed, it would be possible for a single helper thread 22 to be assigned to play the role of all helper thread types listed above.

Figure 7:
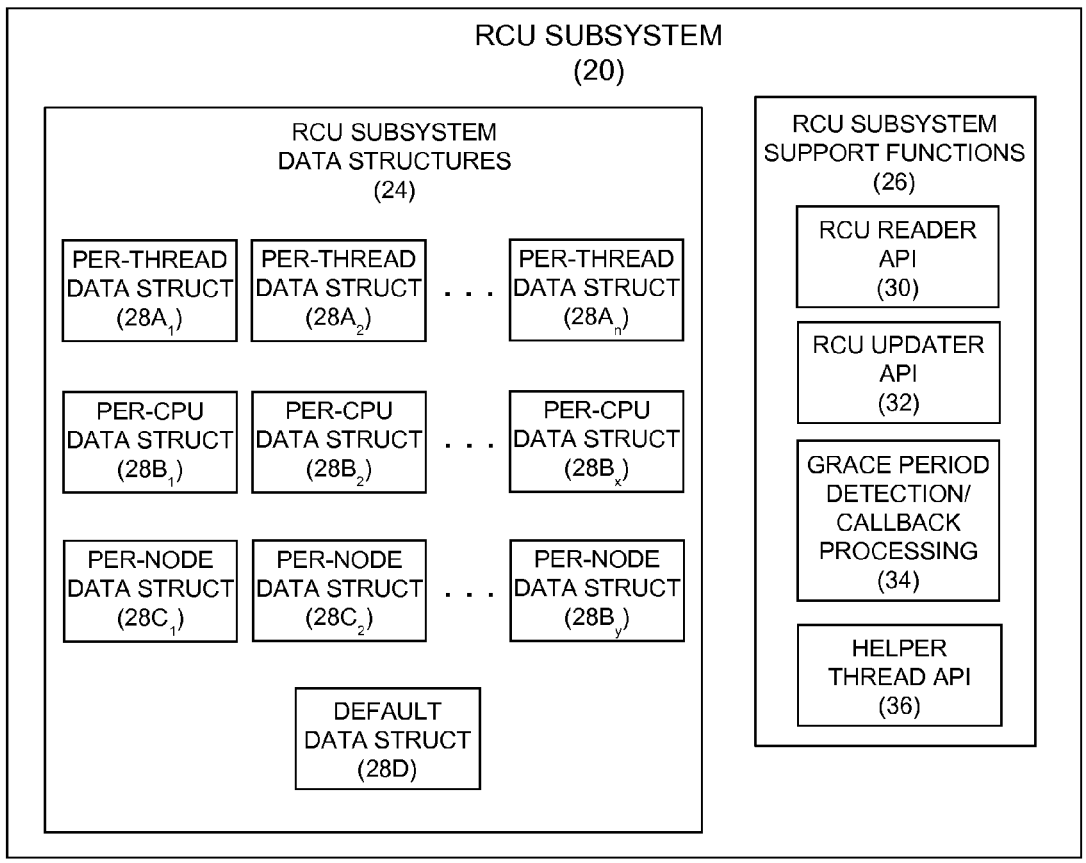
FIG. 7 is a functional block diagram showing an example RCU subsystem that includes two or more RCU subsystem helper thread data structures and a set of RCU subsystem support functions.

Turning now to FIG. 7, example components of the RCU subsystem 20 are shown. These components include several RCU subsystem data structures 24 and a set of RCU subsystem support functions 26. The RCU subsystem data structures 24 include two or more helper thread data structures 28. The RCU subsystem support functions 26 include an RCU reader API (Application Programming Interface) 30, an RCU updater API 32, a grace period detection/callback processing component 34, and a helper thread API 36.

The two or more helper thread data structures 28 respectively correspond to the two or more helper threads 22 shown in FIGS. 6A-6D. For example, per-thread data structures $28A_1, 28A_2 \ldots 28A_n$ may be respectively associated with the per-thread helper threads $22A_1, 22A_2 \ldots 22A_n$ of FIG. 6A. Per-CPU data structures $28B_1, 28B_2 \ldots 28B_x$ may be respectively associated with the per-CPU helper threads $22B_1, 22B_2 \ldots 22B_x$ of FIG. 6B. Per-node data structures $28C_1, 28C_2 \ldots 28C_y$ may be respectively associated with the per-node helper threads $22C_1, 22C_2 \ldots 22C_y$ of FIG. 6C. Finally, a default data structure 28D may be associated with the default helper thread 22D. Each of the foregoing helper thread data structures 28 may be linked together in a linked list, such as by incorporating a list head structure in each such data structure.

Because the helper threads 22 may serve in various roles, their associated helper thread data structures 28 may likewise play different roles. Indeed, the helper thread data structures 28 may be used to assign the helper threads 22 to their various roles. For example, to assign a helper thread 22 to the role of a per-thread helper 22A, a pointer to the associated helper thread data structure 28 may be stored as a per-thread variable for a worker thread that will use the helper thread (e.g., an updater 18). This will cause the helper thread data structure 28 to assume the role of a per-thread data structure 28A. To assign a helper thread 22 to the role of a per-CPU helper 22B, a pointer to the associated helper thread data structure 28 may be stored in an array of pointers to per-CPU data structures 28B, with each array position corresponding to a particular processor 4. This will cause the helper thread data structure 28 to assume the role of a per-CPU data structure 28B. To assign a helper thread 22 to the role of a per-node helper 22C, pointers to the associated helper thread data structure 28 may be stored in the per-CPU pointer array in association with each processor 4 located in a given node 24. This will cause the helper thread data structure 28 to assume the role of a per-node data structure 28C. To assign a helper thread 22 to the role of the default helper 22D, a pointer to the associated helper thread data structure 28 may be stored as a global variable that is accessible by all threads. This will cause the helper thread data structure 28 to assume the role of the default data structure 28D.

Figure 8:
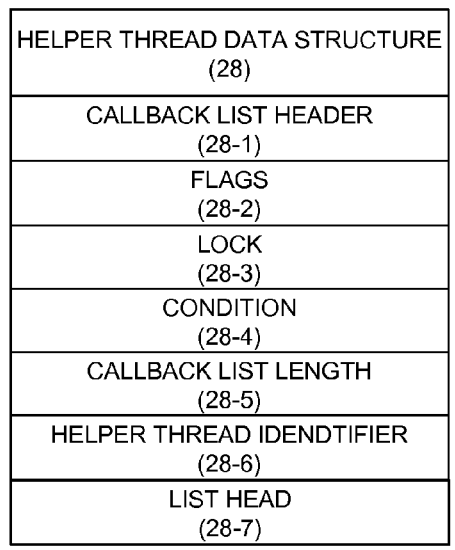
FIG. 8 is a functional block diagram showing an example helper thread data structure.

Turning now to FIG. 8, an example template for each of the helper thread data structures 28 is shown that may include seven fields. A first field 28-1 is a callback list header for a list of callbacks that an associated helper thread will manage and process at the end of a grace period. A second field 28-2 is used to store various thread flags indicating the status of the associated thread. In an example embodiment the following status flags may be represented by setting/clearing bits in this field:
 (1) URCU_CALL_RCU_RT
 (2) URCU_CALL_RCU_RUNNING
 (3) URCU_CALL_RCU_STOP
 (4) URCU_CALL_RCU_STOPPED The URCU_CALL_RCU_RT flag indicates whether the helper thread requires real-time response. In an example embodiment, this flag may be set by the least significant (lowermost) bit of the flags field 28-2. The URCU_CALL_RCU_RUNNING flag indicates whether the associated helper thread 22 is running. In an example embodiment, this flag may be set by the second lowermost bit of the flags field 28-2. The URCU_CALL_RCU_STOP flag tells the associated helper thread 22 to stop. In an example embodiment, this flag may be set by the third lowermost bit of the flags field 28-2. The URCU_CALL_RCU_STOPPED flag is set by the helper thread 22 when it does stop. In an example embodiment, this flag may be set by the fourth lowermost bit of the flags field 28-2.

The third field 28-3 of the helper thread data structure 28 is a lock for serializing access by the associated helper thread 22 to variables that are shared with other helper threads. In an example embodiment, the lock 28-3 may be implemented as a pthread mutex (mutual exclusion) lock. The fourth field 28-4 holds conventional pthread condition variables that are protected by the lock 28-3 and set by conventional pthread condition functions to support synchronization of the associated helper thread 22 with respect to other helper threads. Such condition functions allows the helper thread 22 to suspend execution and relinquish its processor until some predicate on shared data is satisfied. The basic operations on conditions are to (1) signal the condition (when the predicate becomes true), and (2) wait for the condition, suspending the thread execution until another thread signals the condition. Examples condition functions include pthread_cond_init, pthread_cond_signal, and pthread_cond_wait. The pthread_cond_init function initializes the condition variable 28-4. The pthread_cond_signal function restarts the helper thread 22 when the condition indicated by the condition variable has occurred. The pthread_cond_wait function waits for the condition variable 28-4 to be signaled.

The fifth field 28-5 of the helper thread data structure 28 is callback count variable that indicates the length of the callback list linked to the callback list header 28-1. The sixth field 28-6 is a helper thread identifier that contains the pthread_id number of the associated helper thread 22. The seventh field 28-7 is a list head structure for queuing the helper thread data structure 28 on a list of helper thread data structures.

Figure 9:
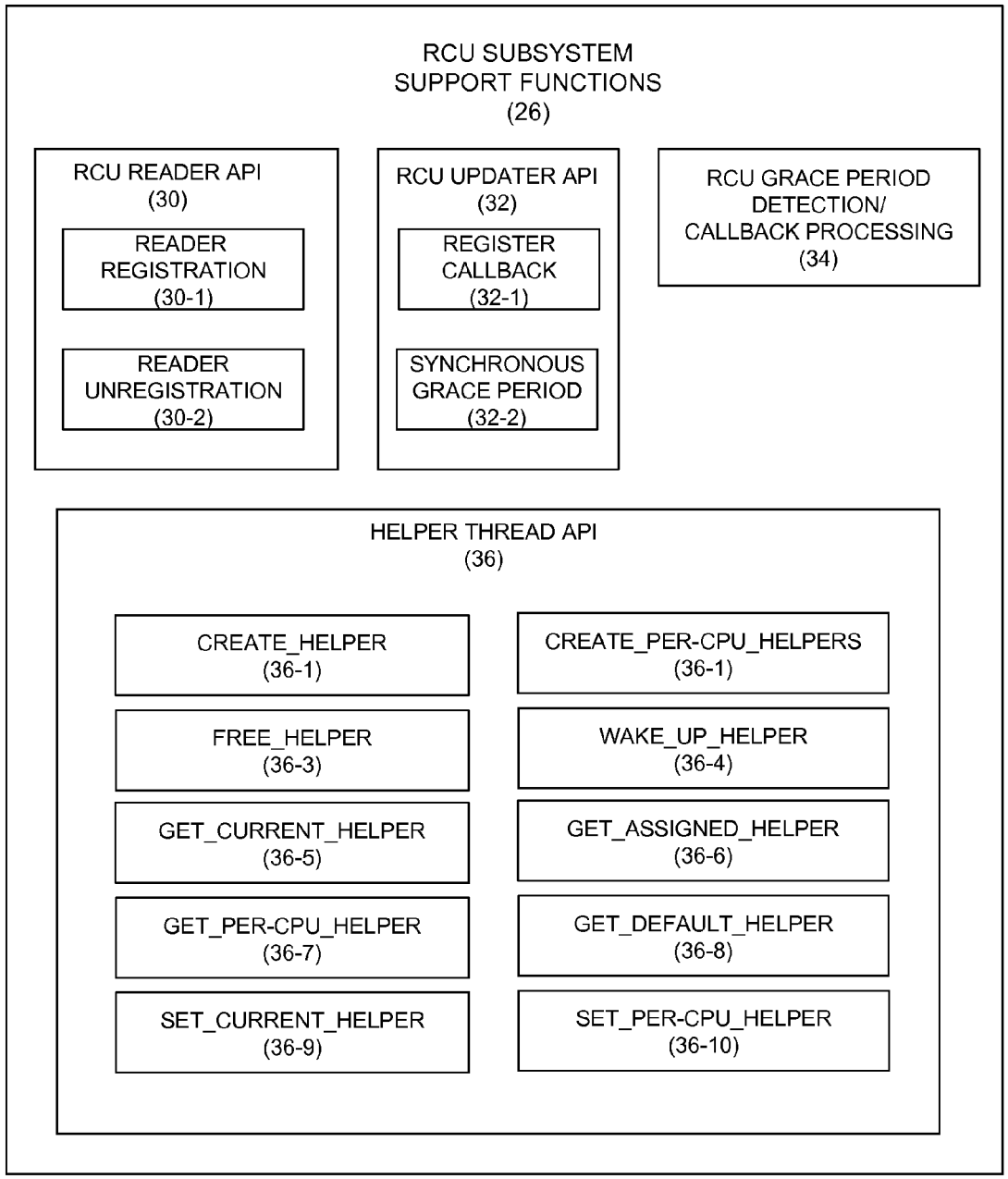
FIG. 9 is a block diagram showing examples of the RCU subsystem support functions of FIG. 7.

Turning now to FIG. 9, individual components of the RCU subsystem support functions 26 are shown. These components may be implemented in any suitable fashion, including within the readers and updaters themselves, or as library functions in a user-level library such as the POSIX threads library. The RCU reader API 30 comprises a reader registration component 30-1 and a reader unregistration component 32-1. These components are respectively invoked by readers 21 as they enter and leave their RCU read-side critical sections in order to allow the RCU subsystem 20 to track reader quiescent states, with all processing performed outside of a set of bounded calls to the reader registration and reader unregistration components 30-1/30-2 being treated as a quiescent state. The operational details of the reader registration component 30-1 and the reader unregistration component 30-2 are not germane to the present disclosure and will therefore not be described. Suffice it to say that there are existing user-level RCU implementations whose reader registration and reader unregistration components may be used to implement the user-level RCU implementation described herein. See, for example, the user-level versions of rcu_read_lock( ) and rcu_read_unlock( ) described in commonly owned U.S. Published Patent Application No. 2010/0023946A1.

The RCU updater API 32 comprises a register callback component 32-1 for use in connection with asynchronous grace period processing, and may also include a synchronous grace period component 32-2. The latter component may be implemented in conventional fashion and its details will therefore not be described. Any suitable user-level version of an RCU primitive such as synchronize_rcu( ) may be used.

See, for example, the user-level version of synchronize_rcu( ) described in commonly owned U.S. Published Patent Application No. 2010/0023946A1. During update operations, an updater 18 may perform a first-phase update to a shared data element 16 and then invoke the synchronous grace period component to 32-2 to force a grace period. The updater 18 would block until the synchronous grace period has ended, then perform a second-phase update to free stale data from memory (or take other actions).

The register callback component 32-1 is used by updaters 18 to register a callback following a first-phase update to a shared data element 16. A user-level version of the call_rcu( ) primitive may be used for this purpose. The details of this primitive will be described in more detail below in connection with FIG. 20. Its principal operations are to identify a helper thread 22 to act on behalf of the updater 18 (or create one if necessary), enqueue a callback on the callback list of the associated helper thread data structure 28, and wake up the helper thread to perform asynchronous grace period detection and callback processing (i.e., by implementing the RCU grace period detection/callback processing component 34).

The RCU grace period detection/callback processing component 34 performs the asynchronous grace period processing referred to in the previous paragraph. These operations are performed by the helper thread 22 that was invoked by the register callback component 32-1. As described in more detail below, these operations comprise waiting for the end of an asynchronous grace period, at which point the callback list 28-1 of the associated helper thread data structure 28 is traversed in order to execute each callback that is ripe for processing.

The helper thread API 36 comprises various helper functions that provide an infrastructure for invoking and using the helper threads 22. These helper functions may include a create_helper component 36-1, a create_per-CPU_helper component 36-2, a free_helper component 36-3, a wake_up_helper component 36-4, a get_current_helper component 36-5, a get_assigned_helper component 36-6, a get_per-CPU_helper component 36-7, a get_default_helper component 36-8, a set_current_helper component 36-9 and a set_per-CPU_helper component 36-10.

Figure 10:
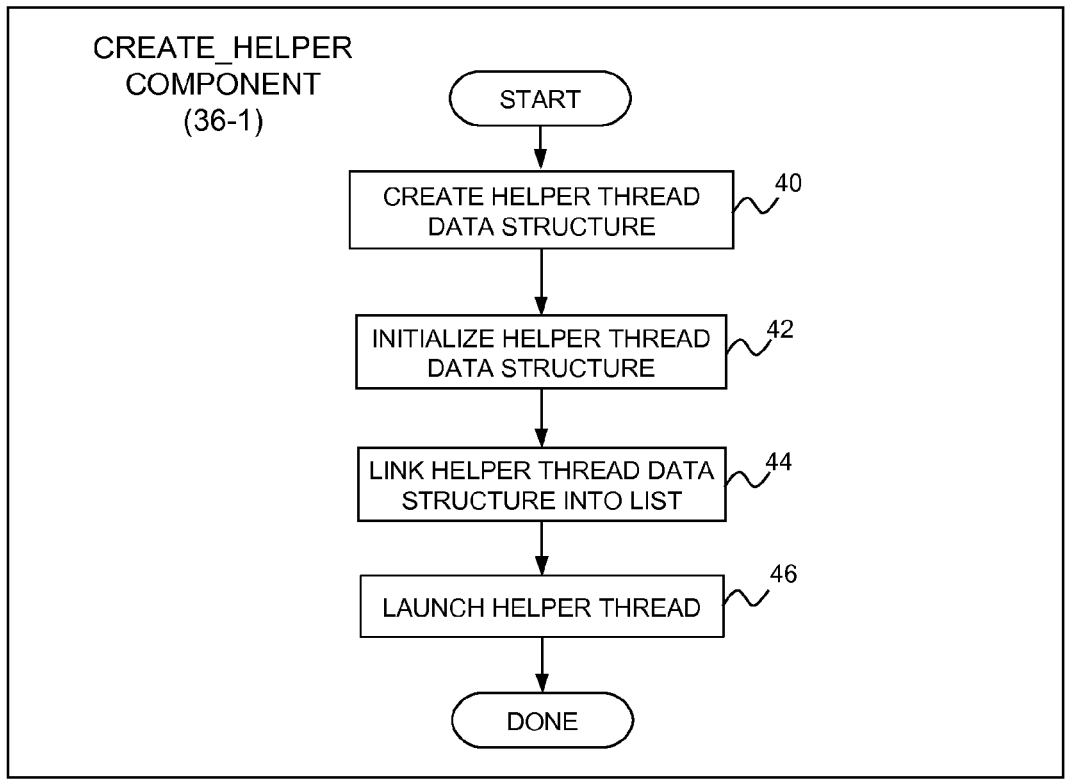
FIG. 10 is a flow diagram illustrating operations that may be performed by a create_helper component of the RCU subsystem support functions of FIG. 9.

Example operations of the create_helper component 36-1 are shown in FIG. 10. Block 40 creates a new helper thread data structure 28. Block 42 initializes the helper thread data structure 28. This initialization may include initializing the callback list 28-1, setting the flag field 28-2 to indicate the URCU_CALL_RCU_RUNNING state, initializing the attributes of the lock 28-3, and initializing the condition variable 28-4. Block 44 adds the helper thread data structure to a linked list of such data structures. Block 46 launches the new helper thread 22, such as by calling the POSIX pthread_create( ) function. The arguments to the pthread_create( ) function will specify the helper thread routine to be performed and the arguments to that routine. In accordance with the present disclosure, the helper thread routine is the grace period detection and callback processing component 36 and the argument to that routine is the new helper thread data structure 28. The operations of the grace period detection and callback processing component 36 are described in more detail below.

Figure 11:
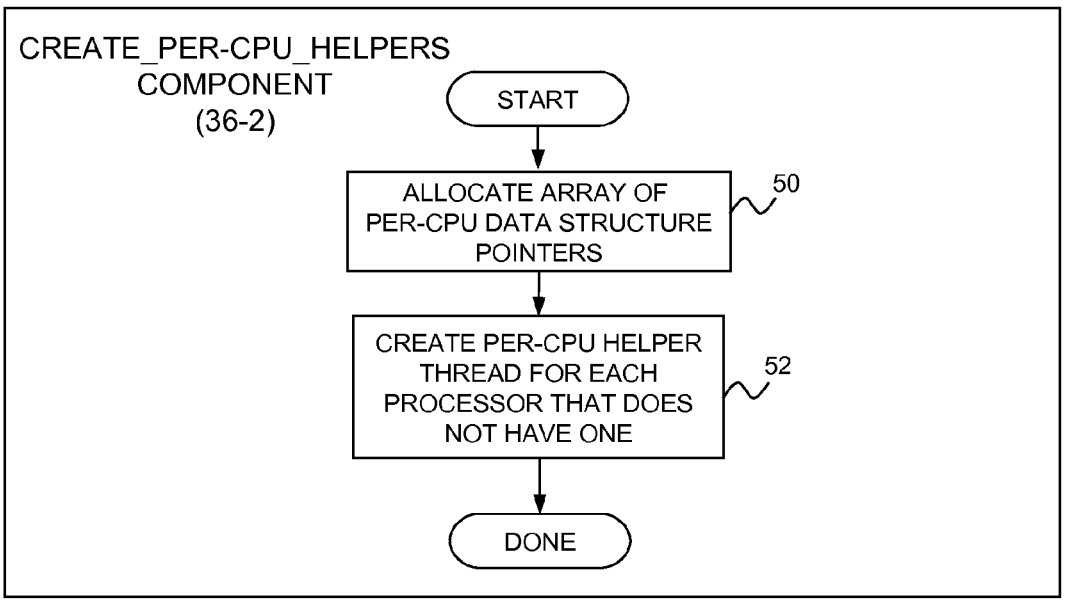
FIG. 11 is a flow diagram illustrating operations that may be performed by a create_per-CPU helper component of the RCU subsystem support functions of FIG. 9.

The create_per_cpu_helpers component 36-1 is used to create a separate per-CPU helper thread 22B for each processor 4 that may be present. Example operations are shown in FIG. 11, in which block 50, allocates an array of pointers to the per-CPU helper threads 22B and then block 52 populates the array by creating one such helper thread for each processor 4 that does not already have a per-CPU helper thread.

Figure 12:
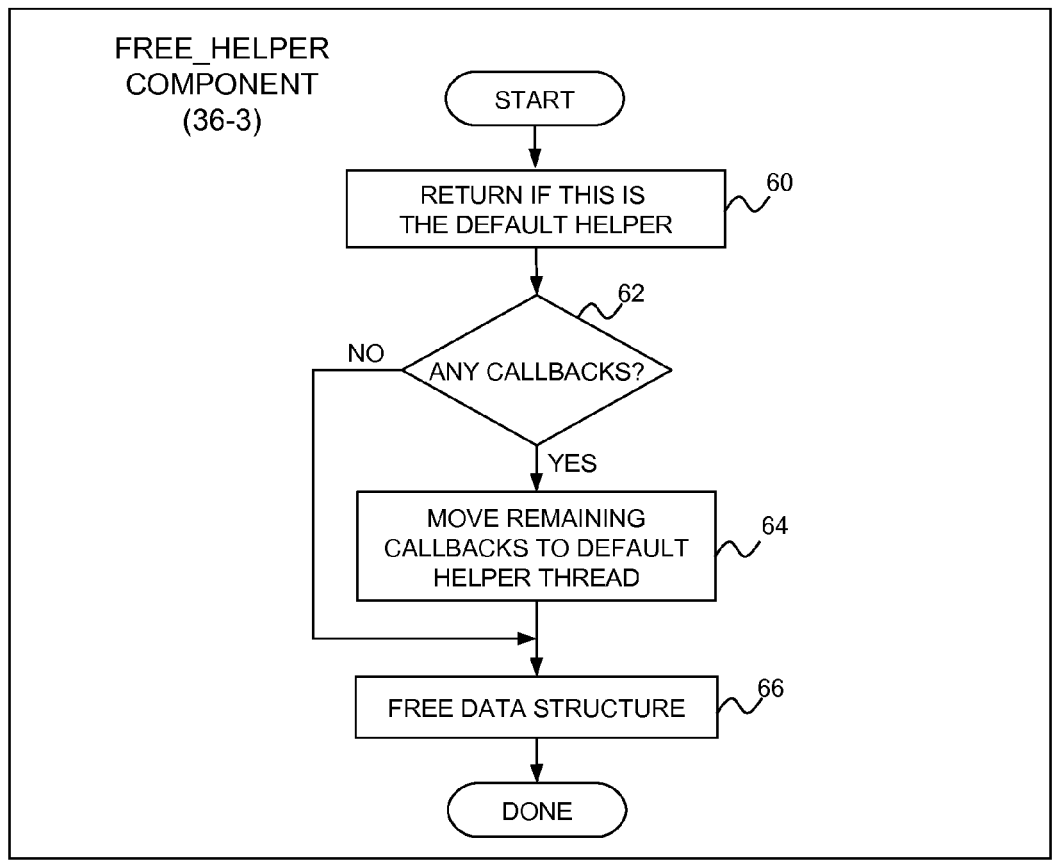
FIG. 12 is a flow diagram illustrating operations that may be performed by a free_helper component of the RCU subsystem support functions of FIG. 9.

The free_helper component 36-2 ends a helper thread 22 and frees its associated helper thread data structure 28. The caller should ensure that the helper thread 22 is no longer in use before invoking this component. Example operations are shown in FIG. 12, beginning with block 60, which returns if an attempt is made to free the default helper thread 22D (or if the specified helper thread does not exist). In block 62, a check is made to see if the helper thread 22 has any pending callbacks that need to be processed. If there are such callbacks, they are transferred to the default helper thread in block 64. Following block 64, or if there were no remaining callbacks in block 62, the associated helper thread data structure 28 is freed from memory.

Figure 13:
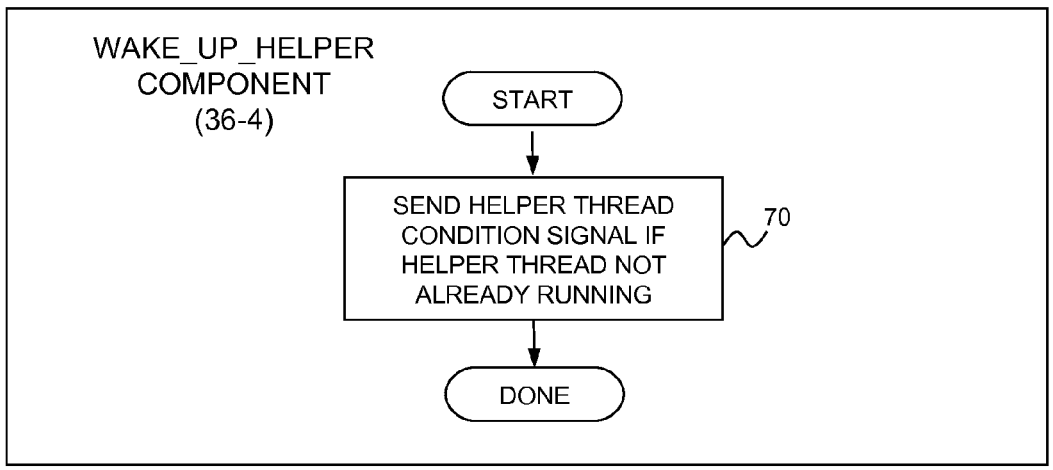
FIG. 13 is a flow diagram illustrating operations that may be performed by a wake_up_helper component of the RCU subsystem support functions of FIG. 9.

The wake_up_helper component 36-4 wakes up a helper thread 22 in order to perform callback processing, but only if the helper thread 22 is servicing a non-real-time worker thread. If the helper thread 22 is servicing a real-time worker thread (as indicated by the flags field 28-2 of the associated helper thread data structure 28 being set to URCU_CALL_RCU_RT), a wake-up signal is not used. Instead, the helper thread 22 polls to await new callbacks, as described in more detail below in connection with FIG. 21. The wake_up_helper component 36-4 is invoked by the register callback component 32-1. Its wake-up operation is shown by block 70 in FIG. 13, which calls pthread_condition_signal to wake the helper thread, provided that the helper thread is not already running.

Figure 14:
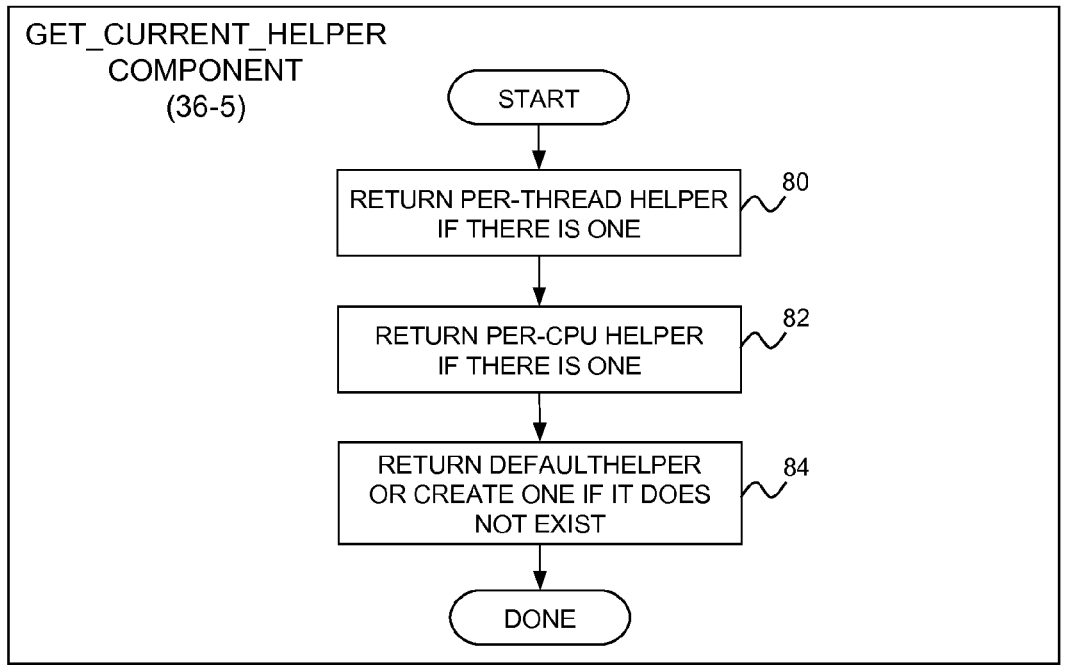
FIG. 14 is a flow diagram illustrating operations that may be performed by a get_current_helper component of the RCU subsystem support functions of FIG. 9.

The get_current_helper component 36-5 is invoked by updaters 18. It returns a pointer to a helper thread data structure 28 for the updater's current helper thread 22. Any per-thread helper 22A assigned specifically to the updater 18 has first priority, followed by any per-CPU helper 22B for the processor 4 which the updater is running, followed by the default helper 22D, if their are no other helpers. Provision could also be made to check for a per-node helper 28C if so desired. Example operations are shown in FIG. 14. Block 80 returns a pointer to the current per-thread data structure 28A being used by the updater 18, if there is one. If the updater 18 is not currently using a per-thread helper 22A, block 82 returns a pointer to the current per-CPU data structure 28B being used by the updater 18, if there is one. If the updater 18 is not currently using a per-CPU helper 22B, block 84 returns a pointer to the default data structure 28D. If for some reason there is no default helper 22D, block 84 will create it. As indicated above, the get_current_helper component 36-5 could be modified to check for and return a pointer the current per-node helper 22C being used by the updater 18, if there is one.

Figure 15:
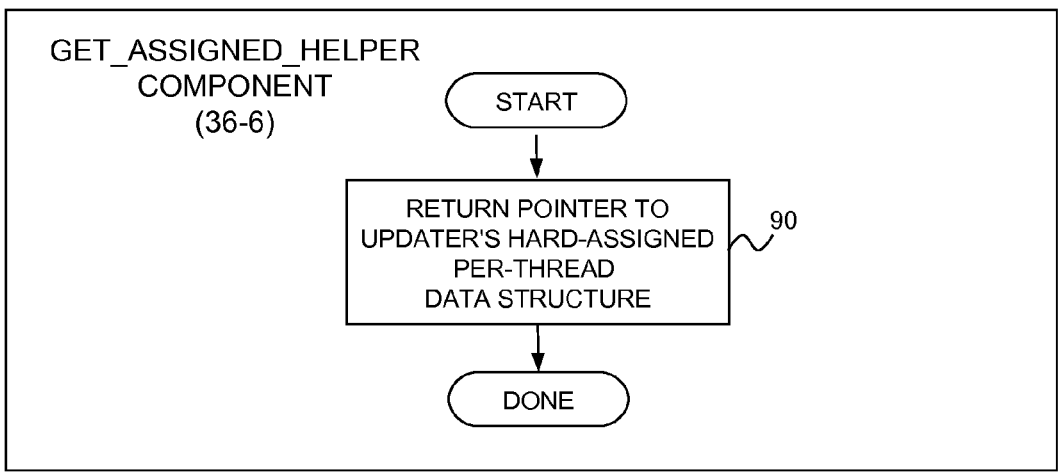
FIG. 15 is a flow diagram illustrating operations that may be performed by a get_assigned_helper component of the RCU subsystem support functions of FIG. 9.

The get_assigned_helper component 36-6 returns a pointer to a per-thread data structure 28A whose associated per-thread helper 22A is hard-assigned to an updater 18. A NULL pointer may be returned if the updater 18 is instead using a per-CPU helper 22B or the default helper 22D. This operation is shown by block 90 in FIG. 15.

Figure 16:
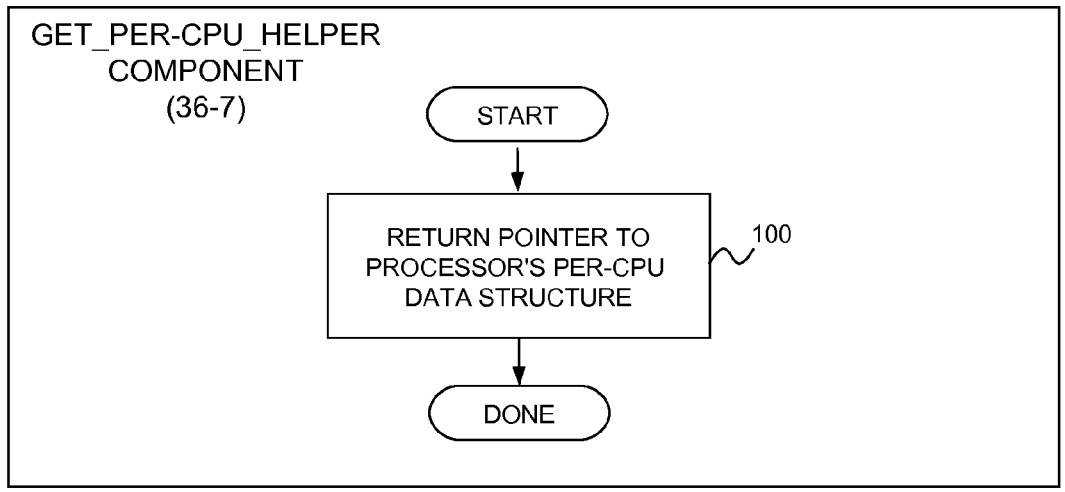
FIG. 16 is a flow diagram illustrating operations that may be performed by a get_per-CPU_helper component of the RCU subsystem support functions of FIG. 9.

The get_per-CPU_helper component 36-7 returns a pointer to a per-CPU data structure 28B for a specified processor 4. A NULL pointer may be returned if there is no per-CPU helper 22B for the indicated processor. This operation is shown by block 100 in FIG. 16.

Figure 17:
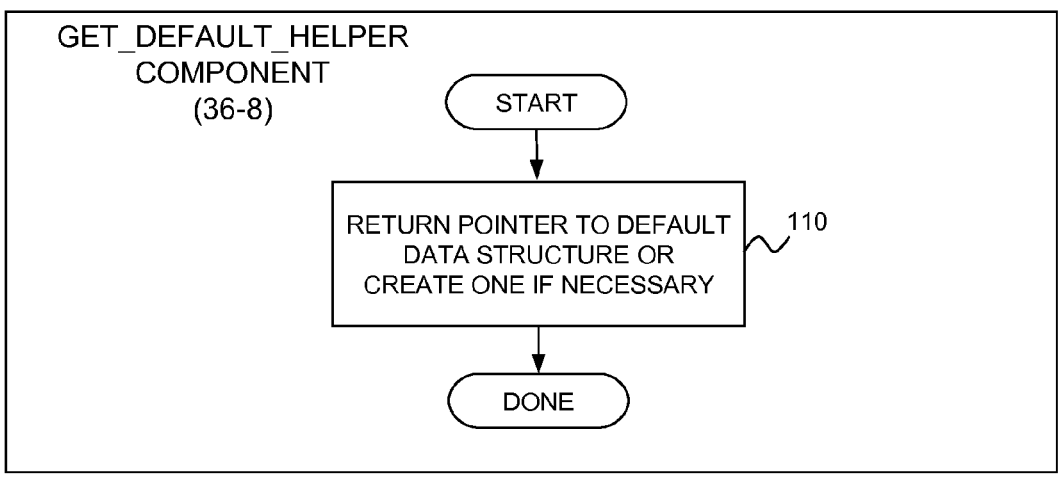
FIG. 17 is a flow diagram illustrating operations that may be performed by a get_default_helper component of the RCU subsystem support functions of FIG. 9.

The get_default_helper_component 36-8 returns a pointer to the default data structure 28D, or creates such a data structure if necessary. This operation is shown by block 110 in FIG. 17.

Figure 18:
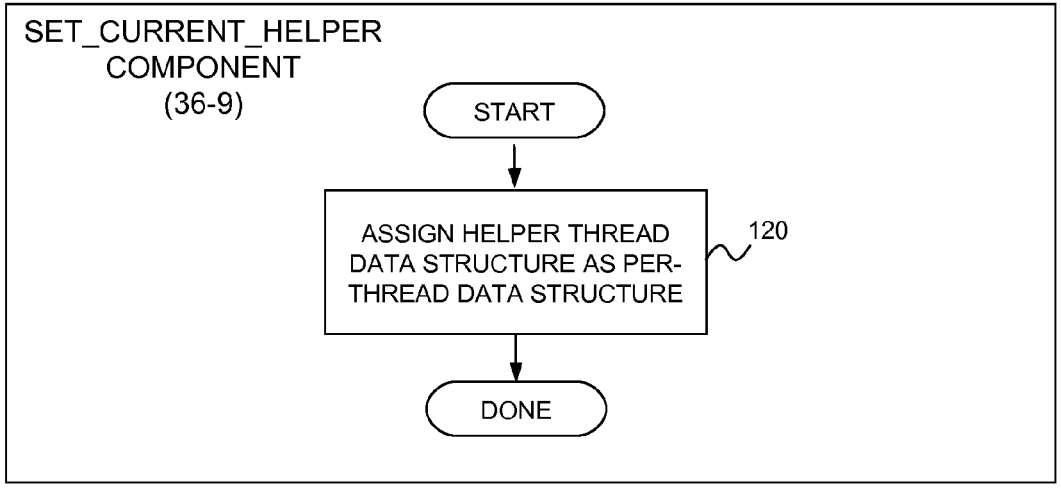
FIG. 18 is a flow diagram illustrating operations that may be performed by a set_current_helper component of the RCU subsystem support functions of FIG. 9.

The set_current_helper component 36-9 is called by an updater 18. It sets the updater's helper thread using a local thread pointer variable that references a specified helper thread data structure 28. The helper thread data structure 28 will thereafter serve as a hard-assigned per-thread data structure 28A. This operation is shown by block 120 in FIG. 18.

Figure 19:
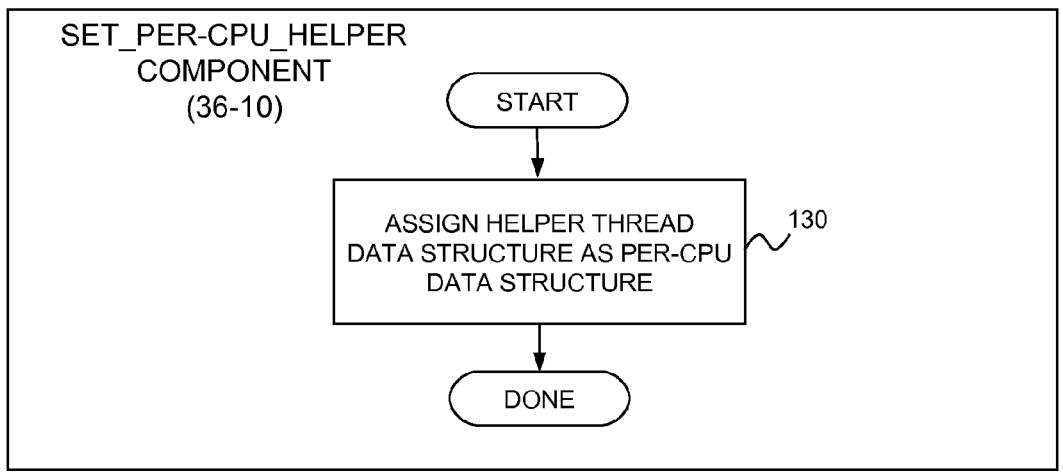
FIG. 19 is a flow diagram illustrating operations that may be performed by a set_per-CPU_helper component of the RCU subsystem support functions of FIG. 9.

The set_per-CPU_helper component 36-10 is used to set a processor's per-CPU helper thread 22B. This may be done by setting a pointer to a specified helper thread data structure 28 in the previously-mentioned pointer array that stores pointers to per-CPU data structures 28B. The specified data structure 28 will be assigned to role of a per-CPU thread data structure 28B. This operation is shown by block 130 in FIG. 19. Note that the set_per-CPU helper_component 36-10 may be used to establish a per-node helper thread 22C. For example, a helper thread 22 may be created using the create_helper component 36-1 for the node 24. Then the set_per-CPU_helper component 36-10 may be invoked to assign the newly created helper thread 22 to each of the node's processors 4.

Having now described the various components that may be used to implement the helper thread API, the operations of the register_callback component 32-1 and the RCU_grace_period_detection_and_callback_processing component 34 may be described in more detail.

Figure 20:
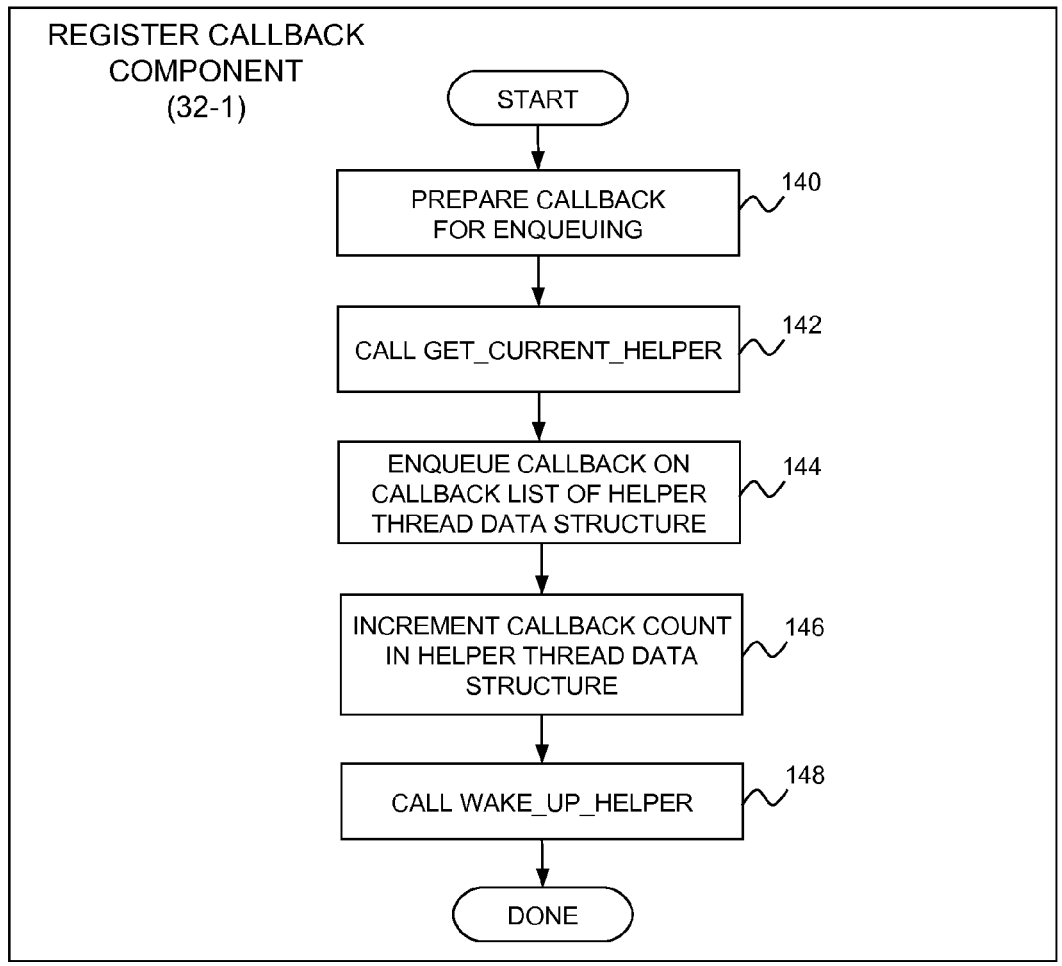
FIG. 20 is a flow diagram illustrating operations that may be performed by a register callback component of the RCU subsystem support functions of FIG. 9.

The register callback component 32-1 is invoked by updaters 18 to schedule a callback function to be executed following the end of a grace period. These operations are performed by a helper thread 22 acting on behalf of worker threads that implement the updaters 18. In most cases, the register callback component 32-1 will be the only function that an updater 18 needs to call in order to invoke a helper thread 22. The various above-described components 36-1 . . . 36-10 of the helper thread API 36 are only needed by the updaters 18 to tune their use of RCU for maximum performance. Example operations of the register callback component 32-1 are shown in FIG. 20. Updaters 18 call this function with callback and its execution function serving as the function parameters. In block 140, the register callback component 32-1 prepares the callback for enqueuing on a callback list. Block 142 parameters calls the get_current_helper component 36-5 described above in connection with FIG. 14. As previously described, this component will return the updater's current helper thread 22 (which may be a per-thread helper 22A, a per-CPU helper 22B, a per-node helper 22C, or the default helper 22D). Block 144 enqueues the callback on the callback list that is linked to the callback list header 28-1 of the helper thread's associated helper thread data structure 28. This enqueuing may be performed using a conventional non-blocking enqueuing technique, as disclosed for example in M. Micheal et al., "Non-blocking algorithms and preemption-safe locking on multiprogrammed shared memory multiprocessors," J. Parallel Distrib. Comput., vol. 51, no. 1, pp. 1-26, 1998. According to this technique, an atomic exchange operation is used to atomically update the callback list's tail pointer to reference the next pointer of the new callback, returning a pointer to the next pointer of the previous callback (or a pointer to the list header if there is no previous element). Then a pointer to the new element is non-atomically updated into the next pointer returned by the atomic exchange operation. This allows unconditional enqueuing in a fixed number of instructions. In block 146, the callback counter 28-5 in the helper thread data structure 28 is incremented to reflect the addition of the new callback. Block 148 calls the wake_up_helper component 36-4 described above in connection with FIG. 13. This wakes up the helper thread 22 so that it can implement the RCU grace period detection/callback processing component 34.

Figure 21:
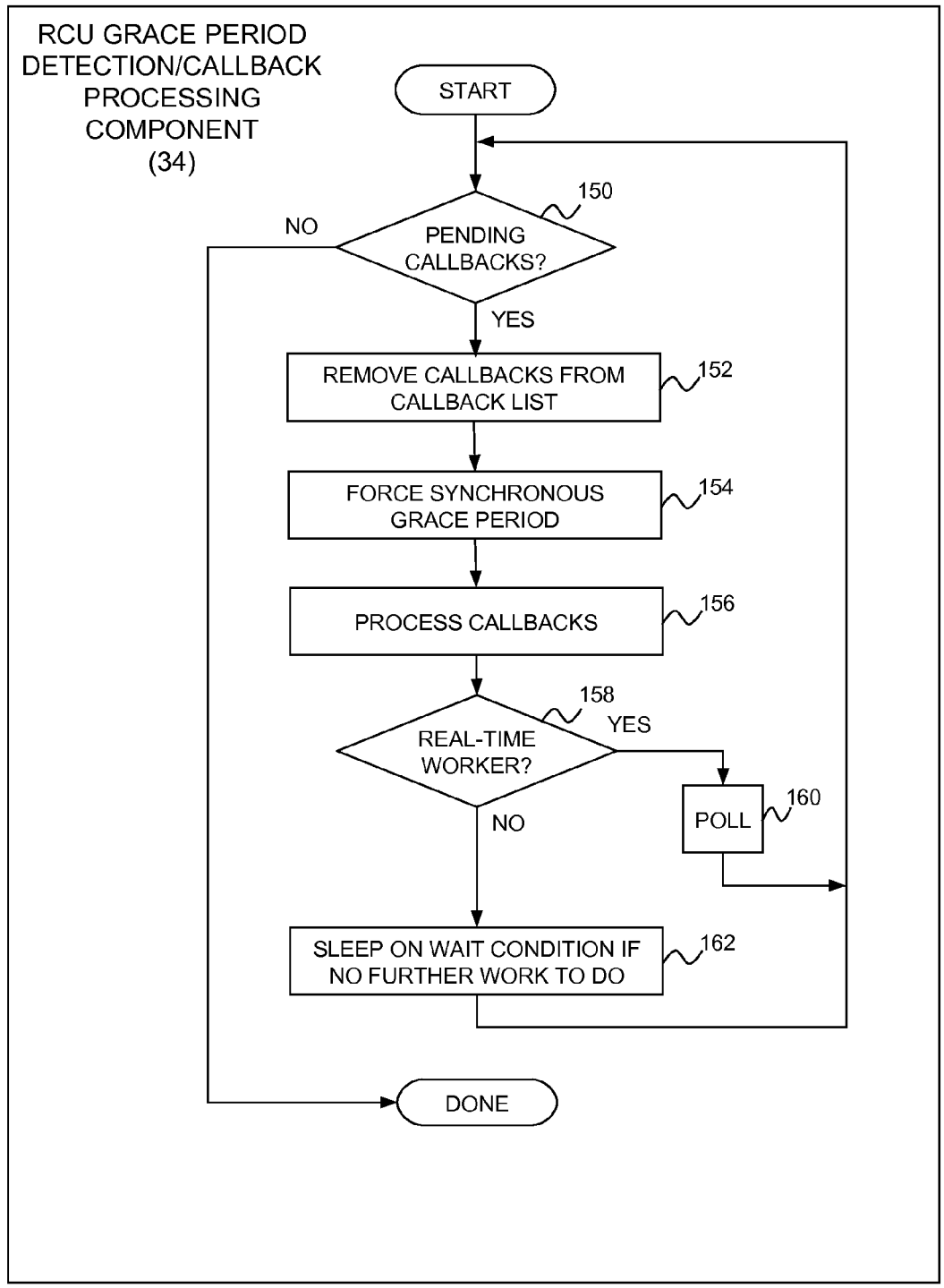
FIG. 21 is a flow diagram illustrating operations that may be performed by an RCU grace period detection/callback processing component of the RCU subsystem support functions of FIG. 9.

Example operations of the RCU grace period detection/callback processing component 34 are shown in FIG. 21. As discussed above, it is invoked by the register callback component 32-1, with a pointer to a helper thread data structure 28 being passed as a parameter. In block 150, a check is made for pending callbacks. If there are none (which is possible if the helper thread 22 was recently invoked by another worker thread to process callbacks, processing returns. If there are pending callbacks, block 152 separates them from the callback list linked to the callback list header 28-1 of the helper thread's associated helper thread data structure 28. This allows new callbacks to accumulate for subsequent execution following a later grace period. Block 154 then forces a synchronous grace period and block 156 processes the callbacks when the grace period ends. At this point, it is desirable to have the helper thread 22 wait until there are more callbacks to processes. How this is handled depends on whether or not the helper thread 22 is servicing a real-time worker thread. Block 158 performs this check by inspecting the flags field 28-2 of the associated helper thread data structure 28 to see if the URCU_CALL_RCU_RT flag is set. If this is the case, it means that the worker thread will not explicitly signal the helper thread 22 to wakeup. The helper thread 22 may therefore poll for a selected time period in block 160 before returning to block 150 to check for more callbacks. On the other hand, if block 158 determines that the helper thread 22 is servicing a non-real-time thread, and provided there is no further work to do (i.e., there are no pending callbacks), the helper thread will be put to sleep in block 162 and the condition field 28-4 of the associated helper thread data structure 28 will be set to indicate this condition. Assuming the helper thread 22 is put to sleep, processing will return to block 150 after the thread is reawakened.

Accordingly, a technique for has been disclosed for effectively implementing asynchronous grace periods in a user-level RCU implementation. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 4-21. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 22:
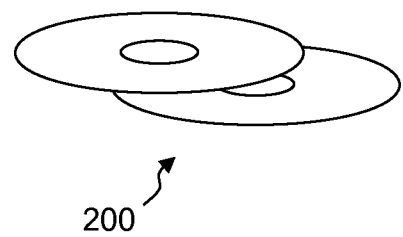
FIG. 22 is a diagrammatic illustration showing example media that may be used to provide a computer program product in accordance with the present disclosure.

Example data storage media for storing such program instructions are shown by reference numerals 8 (memory) and 10 (cache) of the multiprocessor system 2 of FIG. 4 and the uniprocessor system 2A of FIG. 5. The systems 2 and 2A may further include one or more secondary (or tertiary) storage devices (not shown) that could store the program instructions between system reboots. A further example of media that may be used to store the program instructions is shown by reference numeral 200 in FIG. 22. The media 200 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the main memory 8 and the cache memories 10 of FIGS. 4 and 5, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A user-level read-copy update (RCU) method that supports asynchronous grace periods, comprising:
    establishing a user-level RCU subsystem that executes within threads of a user-level multithreaded application;
    said multithreaded application comprising one or more reader threads that read RCU-protected data elements in a shared memory;
    said multithreaded application comprising one or more updater threads that perform updates to said RCU-protected data elements in said shared memory and register callbacks to be executed following a grace period in order to free stale data resulting from said updates;
    said RCU subsystem comprising two or more helper threads (helpers) that are created or selected as needed to track grace periods and execute said callbacks on behalf of said updaters instead of said updaters performing such work themselves;
    wherein said RCU subsystem comprises a grace period detection/callback processing component that is implemented by said two or more helper threads on behalf of said updaters; and
    wherein said grace period detection/callback processing component processes callbacks while they are pending, then either (1) polls for a specified time period to await new callbacks if a real-time updater is being serviced, or (2) sleeps to await awakening if a non-real-time updater is being serviced.

2. A method in accordance with claim 1, wherein said two or more helper threads include a default helper and one or more of a per-thread helper, a per-CPU helper or a per-node helper.

3. A method in accordance with claim 2, wherein a single one of said two or more helper threads is assigned to operate as said default helper and as at least one of said per-thread helper, said per-CPU helper or said per-node helper.

4. A method in accordance with claim 1, wherein said two or more helper threads each have an associated helper thread data structure whose fields include a callback list header field, a flags field, a lock field, a condition field, a callback list length field, a helper thread identifier field and a list head field.

5. A method in accordance with claim 4, wherein said RCU subsystem comprises a register callback component that enqueues a callback on said callback list of one of said helper thread data structures and wakes up said data structure's associated helper thread.

6. A method in accordance with claim 1 wherein said RCU subsystem comprises a set of helper thread functions for creating, ending, waking, querying and assigning said two or more helper threads.

7. A user-level read-copy update (RCU) method that supports asynchronous grace periods, comprising:
    establishing a user-level RCU subsystem that executes within threads of a user-level multithreaded application;
    said multithreaded application comprising one or more reader threads that read RCU-protected data elements in a shared memory;
    said multithreaded application comprising one or more updater threads that perform updates to said RCU-protected data elements in said shared memory and register callbacks to be executed following a grace period in order to free stale data resulting from said updates;
    said RCU subsystem comprising plural helper threads (helpers) that are separate from said updaters and which track grace periods and execute said callbacks on behalf of said updaters;
    said helper threads comprising a default helper and one or more of a per-thread helper, a per-CPU helper or a per-node helper;
    wherein said RCU subsystem comprises a grace period detection/callback processing component that is implemented by said two or more helper threads on behalf of said updaters; and
    wherein said grace period detection/callback processing component processes callbacks while they are pending, then either (1) polls for a specified time period to await new callbacks if a real-time updater is being serviced, or (2) sleeps to await awakening if a non-real-time updater is being serviced.

* * * * *